US012234051B1

(12) United States Patent
Naslund

(10) Patent No.: US 12,234,051 B1
(45) Date of Patent: Feb. 25, 2025

(54) DEVICE FOR APPLYING LABELS TO CONTAINERS

(71) Applicant: Lawrence Naslund, Cedaredge, CO (US)

(72) Inventor: Lawrence Naslund, Cedaredge, CO (US)

( * ) Notice: Subject to any disclaimer, the term of this patent is extended or adjusted under 35 U.S.C. 154(b) by 0 days.

(21) Appl. No.: 18/632,184

(22) Filed: Apr. 10, 2024

(51) Int. Cl.
*B65C 9/06* (2006.01)
*B65C 3/00* (2006.01)
*B65C 3/14* (2006.01)

(52) U.S. Cl.
CPC ................ *B65C 9/06* (2013.01); *B65C 3/145* (2013.01)

(58) Field of Classification Search
USPC ....... 156/475, 447, 446, 445, 443, 391, 249, 156/247, 215, 212, 476, 486, 487, 488, 156/489, 490, DIG. 10, DIG. 11, DIG. 12, 156/DIG. 13; 269/1, 2, 41, 59, 60, 71, 269/72, 289 R, 290, 291, 296, 297, 298, 269/300, 301, 303, 304, 309, 311, 315, 269/318, 900, 909
See application file for complete search history.

(56) References Cited

U.S. PATENT DOCUMENTS 2,147,262 A * 2/1939 Mandel ................... B65C 3/105 156/DIG. 10
2,166,497 A * 7/1939 Knoedler .................. B65C 3/10 156/488

OTHER PUBLICATIONS

From Google Patents: U.S. Pat. No. 730,424; Inventor: Wenzel; Published Jun. 9, 1903; 11 pages. (Year: 1903).*
From Google Patents: U.S. Pat. No. 479,209; Inventor: Eymer; Published Jul. 19, 1892; 5 pages. (Year: 1892).*
Wine Bottle—Standard (750 mL); 7 pages; May 26, 2022. (Year: 2022).*
Etsy: Labeling Tool; 16 pages; Dec. 25, 2023. (Year: 2023).*
CTM Labeling Systems; 8 pages; Mar. 19, 2017. (Year: 2017).*
Google Patents: U.S. Pat. No. 628,307; Inventor: Fyfe; Published Jul. 4, 1899; 8 pages. (Year: 1899).*
Google Patents: U.S. Pat. No. 630,342; Inventor: Giper; Published Aug. 8, 1899; 15 pages. (Year: 1899).*
Label Wizard; Published Dec. 25, 2017; 3 pages. (Year: 2017).*
English machine translation of CN111846499 to Deng; Oct. 30, 2020; B65C9/1869; 18 pages. (Year: 2020).*
English machine translation of CN207029773 to Liu; Feb. 23, 2018; 19 pages. (Year: 2018).*

* cited by examiner

*Primary Examiner* — Linda L Gray
(74) *Attorney, Agent, or Firm* — Perkins Coie LLP; Alberto Araiza; Adwait Jawale

(57) ABSTRACT

A label applicator apparatus for applying an adhesive-backed label to a container is disclosed herein. The label is applied accurately at a desired height and positioned to be perfectly horizontal. The apparatus comprises a cradle comprising a headboard, a footboard, and two adjustable parallel rails forming a carriage for the container. The apparatus also includes an adjustable horizontal label stop that has a curved flange curving across the adjustable carriage and an adjustable bottle stop that can slide forwards and backwards. The adjustable bottle stop is positioned to apply the label to the container at a desired height, the container is placed on the carriage, the adjustable horizontal label stop is closed over the container, and the label is applied by aligning the label horizontally such that it touches the label stop at two contact points.

18 Claims, 11 Drawing Sheets

DEVICE FOR APPLYING LABELS TO CONTAINERS

BACKGROUND

A label is a piece of paper, plastic film, cloth, metal, or other material, affixed to a container or product, on which is written or printed information or symbols about the product or item. Information printed directly on a container or article can also be considered labelling. Labels have many uses, including promotion and providing information on a product's brand name, contents, composition, origin, manufacturer, use, safety, shelf life, and disposal, some or all of which may be governed by legislation. Methods of production and attachment to packaging are many and various and may also be subject to internationally recognized standards. In many countries, hazardous products such as poisons or flammable liquids must have a warning label.

BRIEF DESCRIPTION OF THE DRAWINGS

Detailed descriptions of implementations of the present invention will be described and explained through the use of the accompanying drawings.

Figure 1:
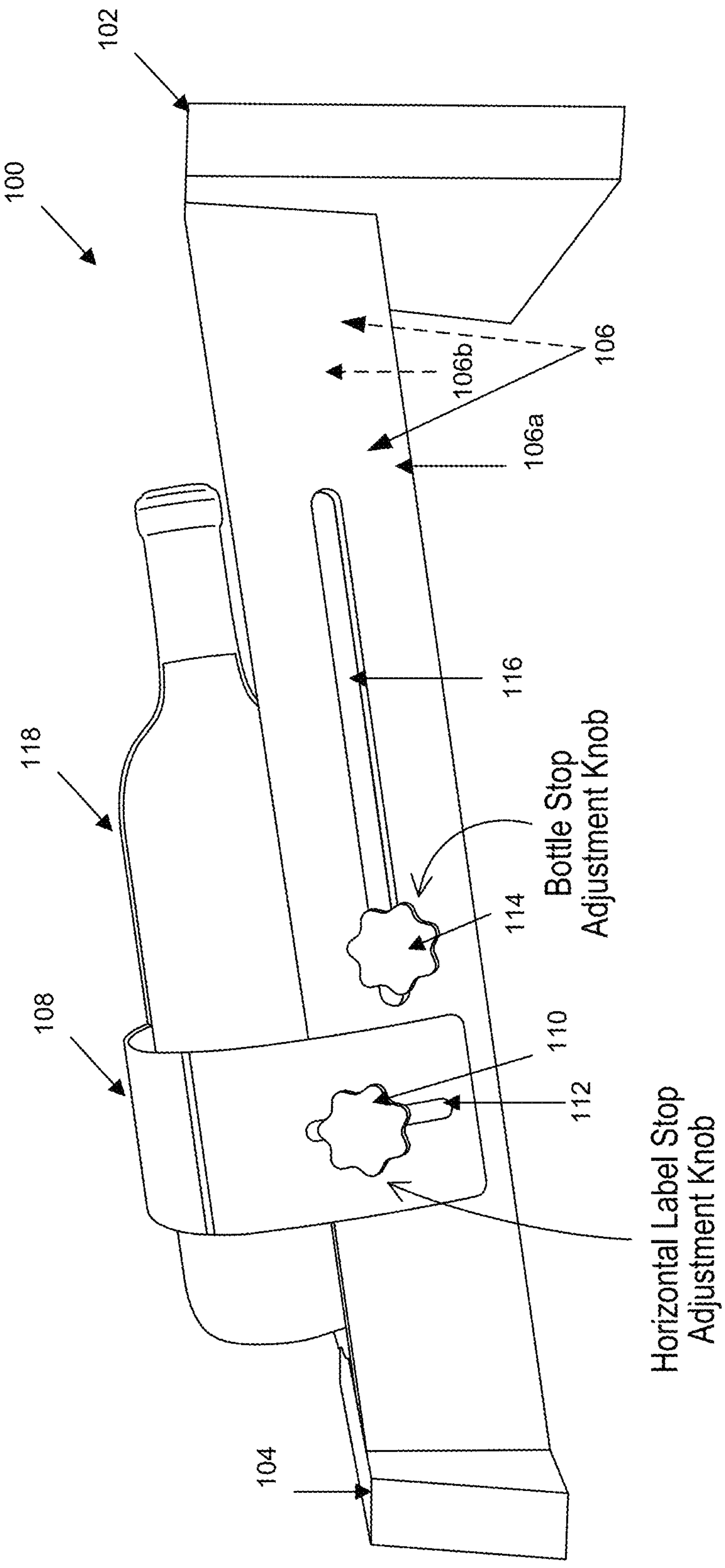
FIG. 1 is a sideview of a device that can implement aspects of the present invention to apply a label to a standard 750 ml wine bottle.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The inventor has a history in the wine business. During his experience running a small start-up winery producing about 400 cases of wine, including up to eight varietals per year, the inventor recognized a need for a small, inexpensive, easy-to-use, manually operated apparatus for consistently applying labels to containers such as bottles and jars. Through the inventor's own experience, he understood that applying labels to wine bottles by hand was a frustrating and time-consuming experience. Manually applied labels can often be horizontally misaligned with the base of the bottle, or are frequently positioned inconsistently, i.e., too high or too low on the bottle. Thus, while a label application apparatus is desirable to apply labels consistently, small businesses making products in small quantities in small factories may not be able to afford large, expensive, and high-volume labeling machines that are available in the market. The inventor has recognized that what such businesses need is a small, inexpensive, adaptable, low-maintenance, and easy-to-use apparatus, such as the one disclosed here.

The disclosed invention includes a rectangular cradle comprising a right rail forming a right wall of the cradle, a left rail forming a left wall of the cradle, a headboard forming a top wall of the cradle, and a footboard forming a bottom wall of the cradle. The right rail and the left rail are positioned parallel to each other and collectively can be referred to as rails or parallel rails. In some implementations, the rails can be L-shaped. The headboard can be referred to as a header and the footboard can be referred to as a footer. The parallel rails hold in place laterally a container to which a label is to be applied. A side of the container rests on the inside edges of the parallel rails. The base of the container rests on an adjustable bottle stop inside the cradle. A curved flange is attached with a hinge mechanism to at least one rail and extends to the other rail such that it lies perpendicular to both rails. The curved flange has a curve of a sufficient radius to accommodate a container under the curve. An operator of the apparatus can place the container inside the cradle between the parallel rails, close the curved flange across the container, and apply a label to the container above the flange by using the flange as a physical and visual guide for accurate horizontal and vertical placement of the label. The disclosed invention also includes a method for applying an adhesive-backed label to a container. The disclosed invention also includes a system caused to apply an adhesive-backed label to a container.

In some implementations, the bottle stop can be an L-shaped sliding bottle stop that can slide within the rectangular cradle along the parallel rails to position the container at a desired height for applying the label. In some implementations, the position of the sliding bottle stop can be adjusted using at least one bottle stop adjustment knob within a longitudinal slot disposed in at least one rail. In some implementations, the longitudinal slot can be disposed in the right rail.

In some implementations, the curved flange can be attached to at least one rail with a spring-loaded mechanism. In some implementations, the curved flange can be raised or lowered above the parallel rails by adjusting a horizontal label stop adjustment knob within a longitudinal slot disposed in the curved flange. The operator can place a bottom edge of a flat label on the container by touching the label against two contact points along the curvature of the flange, thereby horizontally placing the label. The apparatus is designed to primarily work with sheet-cut, adhesive-backed labels, although other type of labels can also be used.

In some implementations, the headboard is taller than the footboard. In some implementations, a height where the parallel rails attach to the footboard is lower than a height where the parallel rails attach to the headboard, such that the rails, while being parallel to each other, are positioned at an incline rather than parallel to the ground. The inclination imparts additional stability to the apparatus by holding the container towards the user under an additional force of gravity. The inclination can be any value between 0° and 90°.

In some implementations, the distance between the parallel rails can be adjusted to accommodate containers of various sizes. In some implementations, the distance between the two parallel rails can be 2 inches to accommodate a standard 750 ml wine bottle. In one example, the apparatus can be used to apply a label to a wine bottle. In another example, the apparatus can be used to apply a label to a beer bottle. The beer bottle can be a standard beer bottle such as, for example, a longneck Industry Standard Bottle (ISB) with a capacity between 300 ml and 400 ml. The apparatus can also be used to apply labels to other common types of jars, bottles, and other containers.

In some implementations, the apparatus can be used to apply a single label to a container. The operator can use a sheet-cut label with split-cut adhesive backing. The operator removes the backing from a right side of the label, thereby exposing the label's adhesive surface. Then, the operator can place the label on the container by holding it to the two contact points created by the horizontal bottle stop, smoothly applying a right side of the label to the container with the operator's fingertips. Then, the operator can move the container up slightly out of contact with the horizontal bottle stop and remove a remainder of the adhesive backing, followed by smoothly applying a left side of the label onto the bottle.

In some implementations, when a label with full adhesive backing is used instead of a label with split-cut adhesive backing, the operator can remove the entire backing and then hold the label slightly above the container's surface. Then, the operator can engage a bottom of the label with two contact points formed with the curved flange, push the label down onto the container, and then smooth the label out from the center of the label. The operator can then remove the labeled container from the rails and engage the next container in a continuous and smooth operation.

In some implementations, the apparatus can be used to apply more than one label, for example, a front label and a back label, to a container. When applying two labels to a container, the operator can place two stacks of sheet-cut, adhesive-backed labels beside the apparatus and place the container on the rails in the cradle. The operator can then adjust the bottle stop and the horizontal label stop to position the container at a desired height above the footboard. A standard wine bottle has two vertical seams, one on either side of the bottle. When the container is a standard wine bottle, the operator can rotate the bottle such that one seam becomes visible on the right side of the bottle. The operator can then apply the front label by aligning a right edge of the front label with the right seam of the bottle by engaging two contact points formed between a top edge of the curved flange and the label. Then, the operator can rotate the bottle by 180° such that the left seam of the bottle now appears on the right side of the bottle and apply the back label by following a similar process. The front and back labels thus applied will be perfectly horizontal, the correct distance from the bottom of the bottle, and exactly opposite each other on the bottle.

In some implementations, the apparatus can include an accessory known as a pony rider attached to an inner side of a rail to accommodate bottles and containers smaller than a standard 750 ml wine bottle. The smaller containers that can be accommodated using the pony rider include, for example, a standard beer bottle, a 375 ml wine bottle (which is sometimes known as a "split" or a "pony"), and containers for cosmetics or sauces. In some implementations, the pony rider can be a wooden piece. In some implementations, the pony rider can be oblong with an L-shaped transverse cross-section, with any length in the range of 2 inches to 12 inches. In some implementations, the pony rider can be 5½ inches long. In some implementations, the L-shaped transverse cross-section of the pony rider can have any height between ½ inch and 3 inches on a long side of the L shape and any height between ¼ inch and 2 inches on a short side of the L shape. In some implementations, the L-shaped transverse cross-section of the pony rider can have a height of 1½ inches on the long side of the L shape and a height of ¾ inches on the short side of the L. The pony rider is dimensioned such that, when disposed with a smaller side of the L (for example, the side measuring ¾ inches) facing upward and aligned with the top of the left rail, it can accommodate containers smaller in diameter than a standard wine bottle, such as, for example, a beer bottle or a 375 ml wine bottle that is least 2 inches in diameter. When the pony rider is flipped over and disposed with the large side of the L shape (for example, the side measuring 1½ inches) facing up, it can accommodate an even smaller bottle such as a cosmetic jar or a sauce bottle.

To use the pony rider, the operator can first detach and remove it from the cradle. Then, the operator can rotate the pony rider by 90° and attach it to the inside of the left rail along the shorter side of the pony rider's L shape. The pony rider includes at least two holes for affixing screws for this purpose. The operator can then place the shorter surface or the 1½ inch surface parallel with the rail. The operator can position the smaller side up for beer bottles and 375 ml wine bottles (ponies).

In some applications, the apparatus can be modified such that the parallel rails form a V-shaped carriage wherein the angle between the two arms of the V shape is any value between 0° and 90°, both exclusive. In this configuration, the apparatus can enable the application of a label to a square-shaped quart or pint-sized home canning jar. Such jars require the label to be placed on a flat surface of the jar and do not easily rest on the parallel rails. This position can also accommodate the labeling of magnum wine bottles, champagne bottles, and other containers of sizes larger than standard wine bottles. The labeling process employs the same elements as described heretofore. When used in this configuration, the operator can detach and store the pony rider away since it is not needed. To use the apparatus in this configuration, the operator can loosen two screws included on the bottom of the headboard and footboard, while taking care to not fully remove the screws. Then, the operator can remove the screws from a top surface of both the headboard and the footboard and move the top of each rail outward from the center to a new position in line with at least one hole that is included on a wall of the cradle. Then, the operator can reinsert the previously removed screws and tighten them, thereby forming a V-shaped carriage for the container. Then the operator can tighten at least one bottom screw each that is included on both the headboard and footboard.

Apparatus for Applying a Label to a Container

FIG. 1 is a sideview of an apparatus 100 that can implement aspects of the present invention to apply a label to a container 118 which can be a standard 750 ml wine bottle. The apparatus 100 can include a headboard 102, also known as a header, a footboard 104, also known as a footer, a right rail 106*a* and a left rail 106*b* (not visible in this view), together forming a rectangular cradle upon which a container 118, to which a label is to be applied, can rest. The right rail 106*a* and the left rail 106*b* are parallel to each other. The right rail 106*a* and the left rail 106*b* can be collectively referred to as rails 106 or parallel rails 106. A height at which the rails 106 attach to the headboard 102 can be greater than a height at which the rails 106 attach to the footboard 104, such that the rails 106 are at an incline with a horizontal plane. The rails 106 can be inclined at any angle between 5° and 89°, both inclusive. The incline of the rails 106 allows the container 118 to stably rest over the rails 106 with an additional assistance from the force of gravity. The apparatus can include an adjustable horizontal label stop 108 that is attached to the apparatus above the footboard 104 and is perpendicular to the rails 106. The adjustable horizontal label stop 108 can include a curved section forming a curved flange that wraps across the container 118. The adjustable horizontal label stop 108 can be raised above or lowered towards the container 118 by adjusting a horizontal label stop adjustment knob 110. The horizontal label stop adjustment knob 110 can be coupled to a right rail 106*a* or a left rail 106*b* by a longitudinal slot 112 that is disposed in the adjustable horizontal label stop 108. The distance from the footboard 104 at which the container 118 sits on the rails 106 can be adjusted by adjusting a bottle stop adjustment knob 114 that is coupled to the right rail 106*a* through a longitudinal slot 116 disposed in the right rail 106*a*. The bottle stop adjustment knob 114 is coupled to an adjustable bottle stop (not visible in this view) that is routed through the longitudinal slot 116 disposed in an inner side of the right rail 106*a*.

Figure 2:
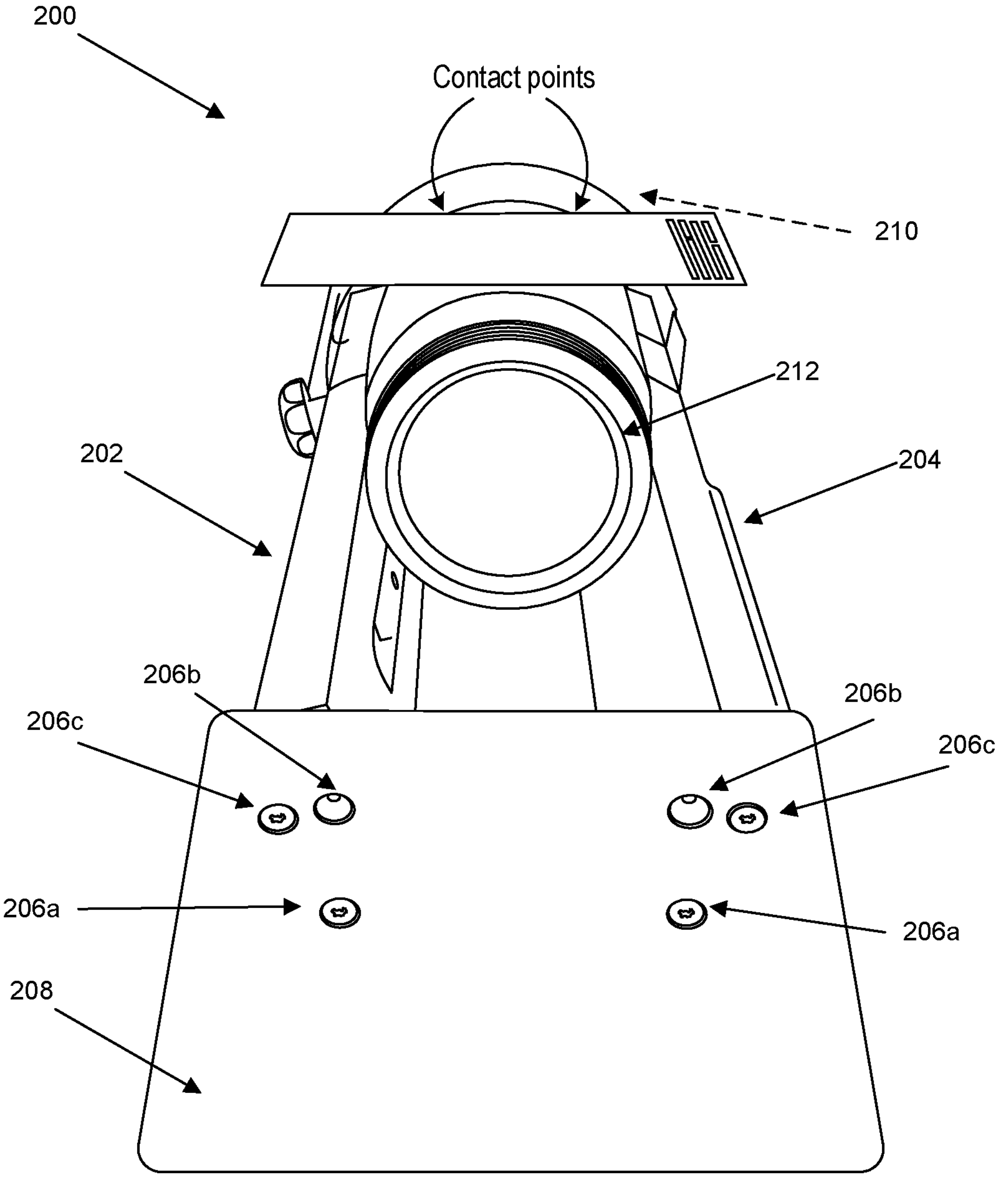
FIG. 2 illustrates an alternative implementation of the present invention for applying a label to a large container.

FIG. 2 illustrates an alternative implementation 200 of the present invention to apply a label to a large container 212. In a default configuration of the apparatus, the right rail 202 and the left rail 204 can attach to the headboard 208 using a set of vertically positioned fasteners 206*a* and 206*b* (and to the footboard 210 using corresponding fasteners on the footboard 210 that are not shown in this view), such that the right rail 202 and the left rail 204 each are perpendicular to a horizontal plane. In this configuration, the apparatus can be used to apply a label to a container such as a standard 750 ml wine bottle. In an alternative configuration, the right rail 202 and the left rail 204 can be attached to the headboard 208 using a set of fasteners 206*a* and 206*c* (and to footboard 210 using corresponding fasteners on the footboard 210 that are not shown in this view) that are positioned at an angle between 0° and 90°, both exclusive to a horizontal plane. In this position, the right rail 202 and the left rail 204 form a V-shaped carriage that can accommodate larger containers 212 than a standard 750 ml wine bottle.

Figure 3:
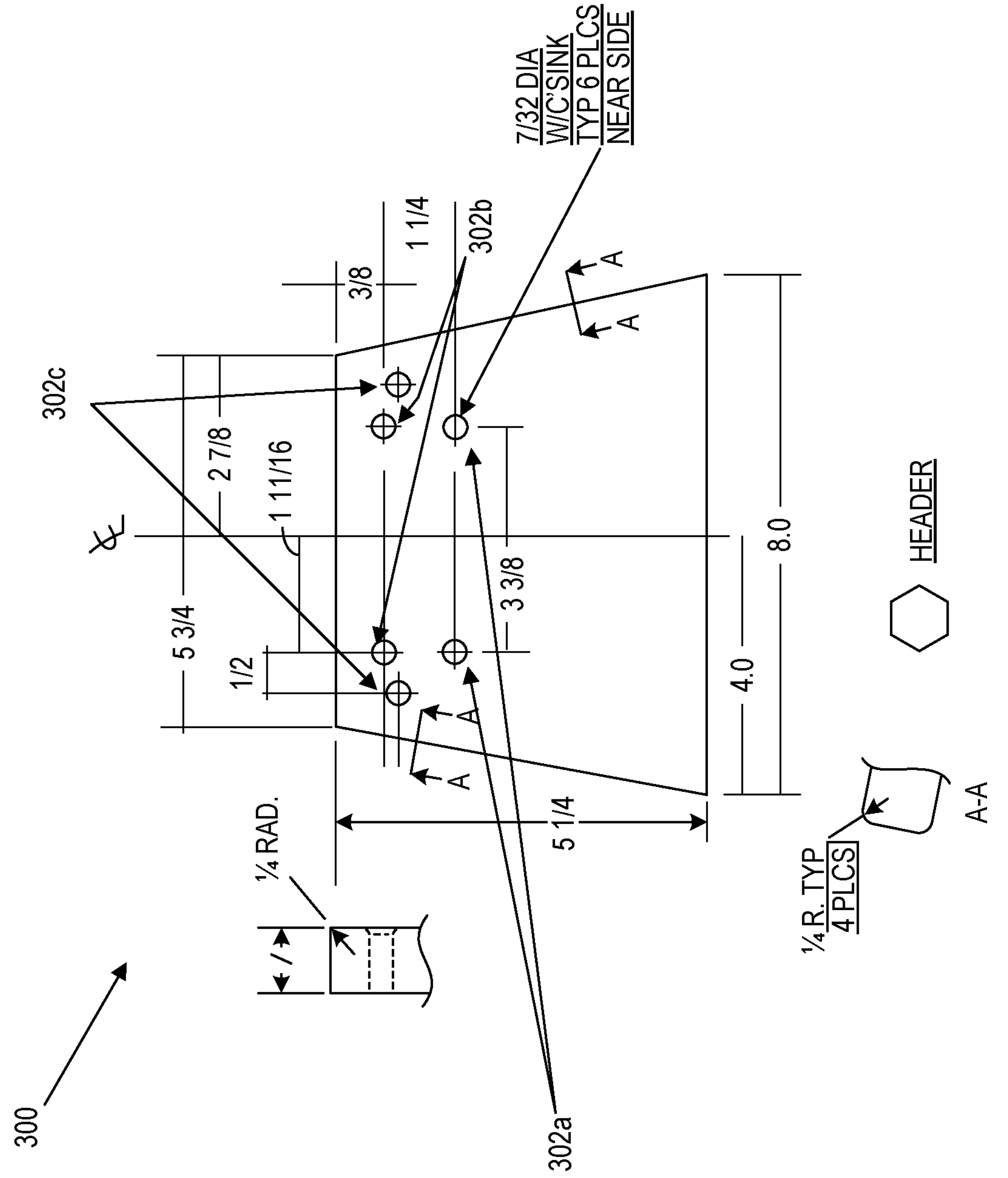
FIG. 3 illustrates a headboard that includes at least some aspects of the present invention.

FIG. 3 illustrates a headboard 300 that includes at least some aspects of the present invention. The headboard can include three sets of fasteners 302*a*, 302*b*, and 302*c* to which the left rail and the right rail attach to the headboard. The fasteners 302*a* and 302*b* are vertically aligned, such that when attached to the headboard 300 through them, the right rail and the left rail can stand perpendicular to a horizontal plane to accommodate a standard 750 ml wine bottle. In an alternative configuration of the apparatus, the right rail and the left rail can be attached to the headboard 300 using fasteners 302*a* and 302*c* which are positioned at an acute angle to a horizontal plane, such that the right rail and the left rail form a V-shaped carriage that can accommodate a larger container than a standard 750 ml wine bottle.

Figure 4:
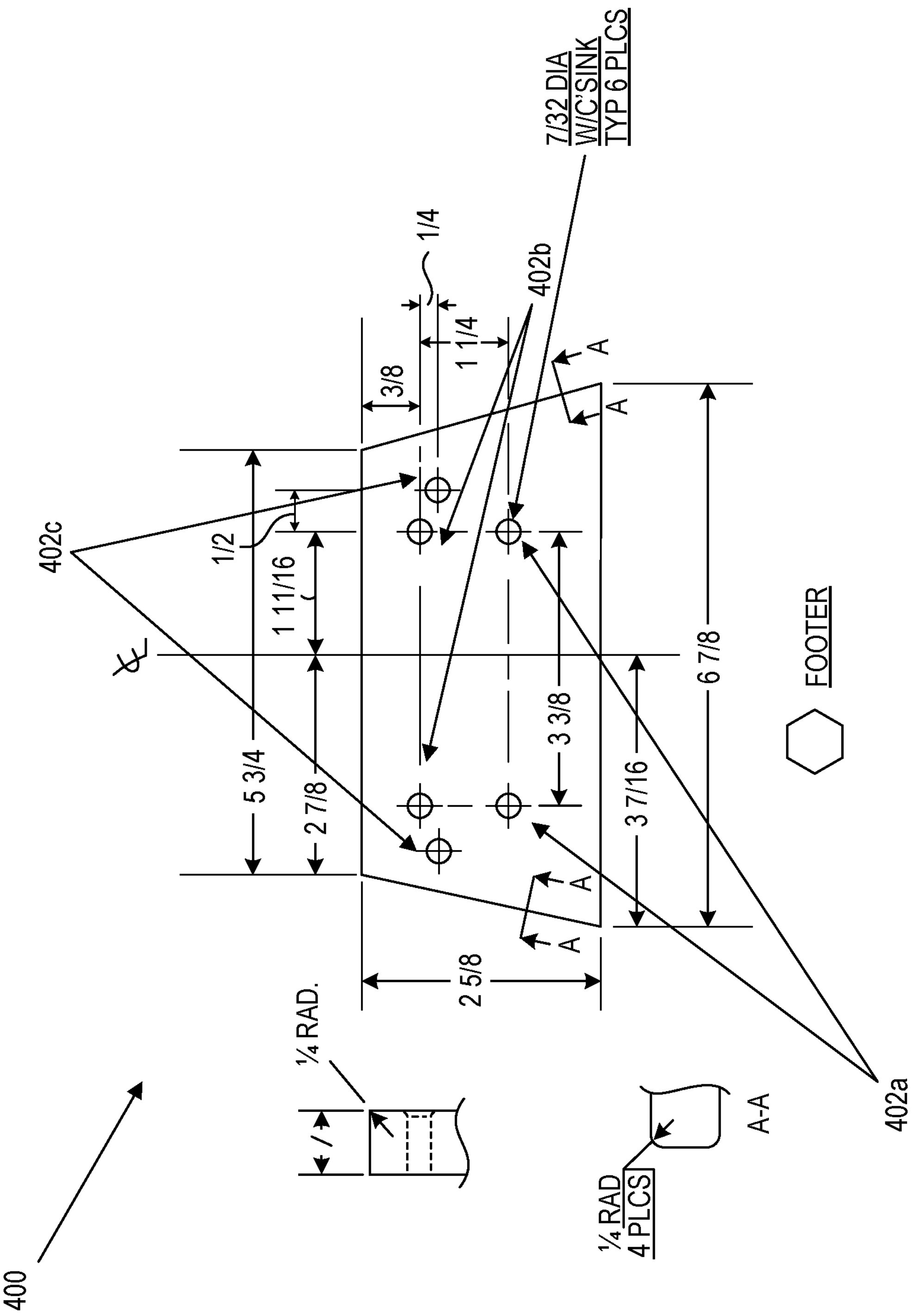
FIG. 4 illustrates a footboard that includes at least some aspects of the present invention.

FIG. 4 illustrates a footboard 400 that includes at least some aspects of the present invention. The footboard can include three sets of fasteners 402*a*, 402*b*, and 402*c* to which the left rail and the right rail attach to the footboard. The fasteners 402*a* and 402*b* are vertically aligned, such that when attached to the footboard 400 through them, the right rail and the left rail can stand perpendicular to a horizontal plane to accommodate a standard 750 ml wine bottle. In an alternative configuration of the apparatus, the right rail and the left rail can be attached to the footboard 400 using fasteners 402*a* and 402*c* which are positioned at an acute angle to a horizontal plane, such that the right rail and the left rail form a V-shaped carriage that can accommodate a larger container than a standard 750 ml wine bottle.

Figure 5:
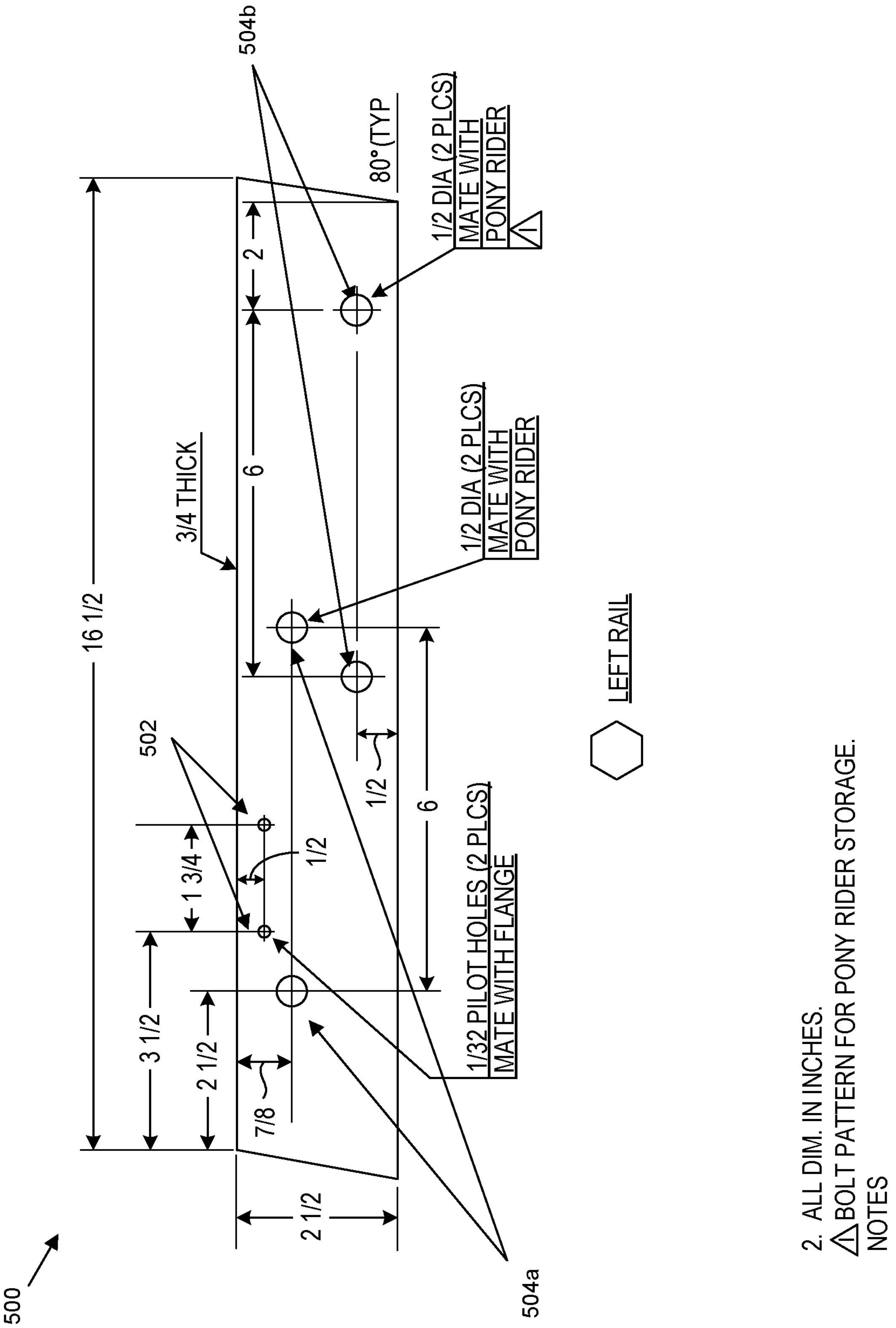
FIG. 5 illustrates a left rail that includes at least some aspects of the present invention.

FIG. 5 illustrates a left rail 500 that includes at least some aspects of the present invention. The adjustable horizontal label stop can attach to the left rail 500 at the attachment points 502. When the apparatus is used to apply a label to a small container than a standard 750 ml wine bottle, the pony rider can be attached to the left rail 500 using the attachment points 504*a*. When not in use, the pony rider can be attached to the left rail 500 for storage using the attachment points 504*b*.

Figure 6:
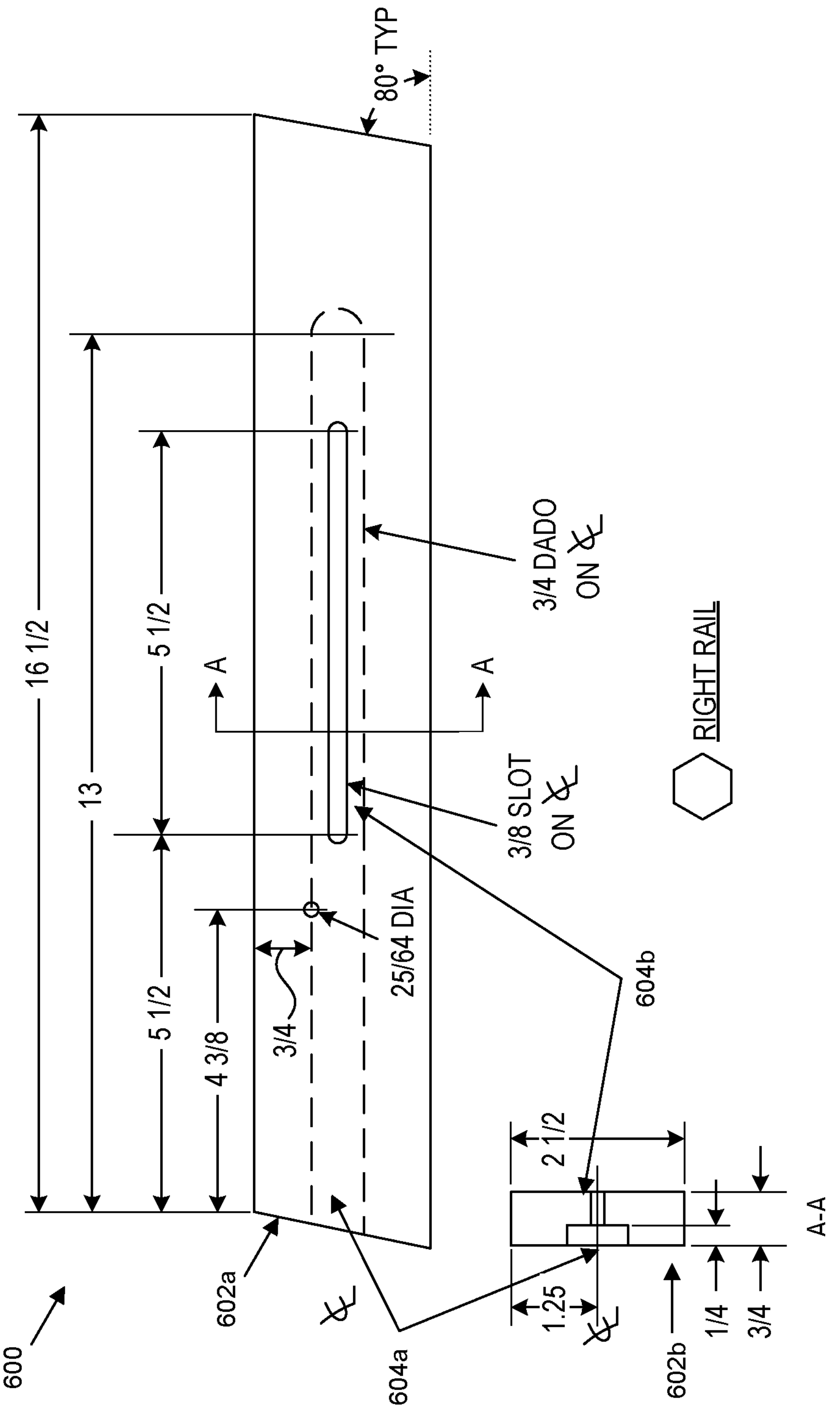
FIG. 6 illustrates a right rail that includes at least some aspects of the present invention.

FIG. 6 illustrates a right rail 600 that includes at least some aspects of the present invention. 602*a* and 602*b* represent a front view and a side view respectively of the right rail 600. The right rail 600 includes a longitudinal slot 604*a* disposed in an inner side of the rail. The adjustable bottle stop is configured to slide forwards and backwards within the longitudinal slot 604*a* to position the container at a height within the apparatus by the operator. Once the container is positioned at the desired height, the operator can tighten a bottle stop adjustment slot that is routed through a longitudinal slot 604*b* disposed in an outer side of the right rail 600.

Figure 7:
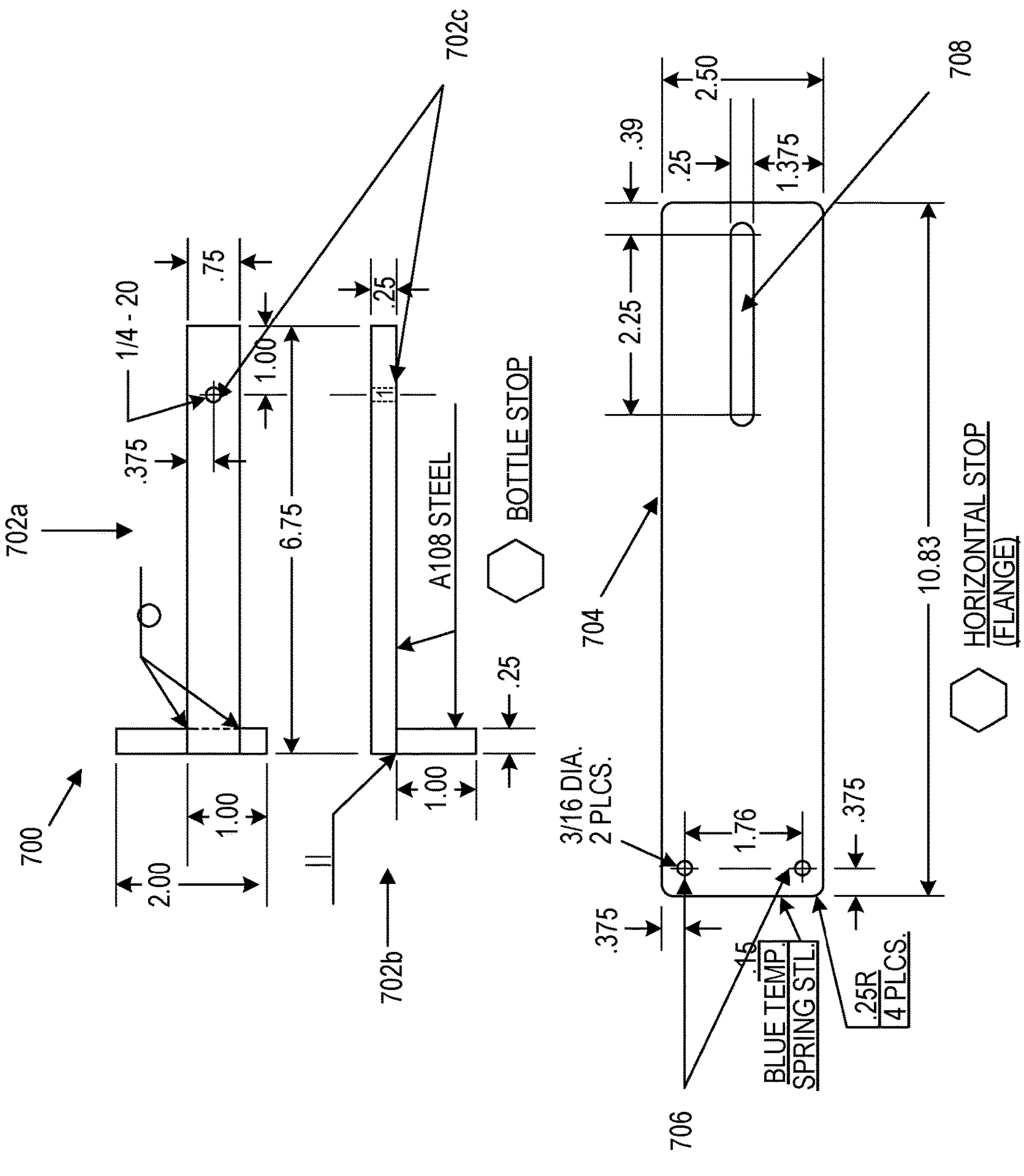
FIG. 7 illustrates an adjustable bottle stop and an adjustable horizontal label stop that includes at least some aspects of the present invention.

FIG. 7 illustrates an adjustable bottle stop 700 and an adjustable horizontal label stop 704 that include at least some aspects of the present invention. 702*a* and 702*b* represent a side view and a top view respectively of the adjustable bottle stop 700. The adjustable bottle stop 700 comprises an L-shaped apparatus that is disposed inside a longitudinal slot disposed in an inner side of the right rail and is configured to slide forwards and backwards within the slot. A bottle stop adjustment knob can be attached to the adjustable bottle stop 700 at the attachment point 702*c*. The adjustable horizontal label stop 704 is an adjustable and flexible flange. In some embodiments, the adjustable horizontal label stop 704 can be composed of a curved sheet of spring steel, plastic, or other suitable flexible material and can be mounted on the outer side of the left rail at an angle of 90° to the parallel rails. Adjustable horizontal label stop 704 can be attached to the left rail at attachment points 706. The adjustable horizontal label stop 704 can wrap over the container positioned on the rails underneath. A horizontal stop adjustment knob is configured to be coupled to the adjustable horizontal label stop 704 through a longitudinal slot 708. The adjustable horizontal label stop 704 can be raised above or lowered towards the container by adjusting the horizontal stop adjustment knob to accommodate a range of circumferences of bottles, jars, and cylindrical containers. The adjustable horizontal label stop 704 can curve around a top surface of the container without directly touching it. In some embodiments, the adjustable horizontal label stop 704 can be positioned ⅛ inch to ¼ inch above the container's surface. The operator can place a bottom edge of a flat label on the container while touching the label against the two contact points created by the curvature of the adjustable horizontal label stop 704, thereby horizontally placing the label.

Figure 8:
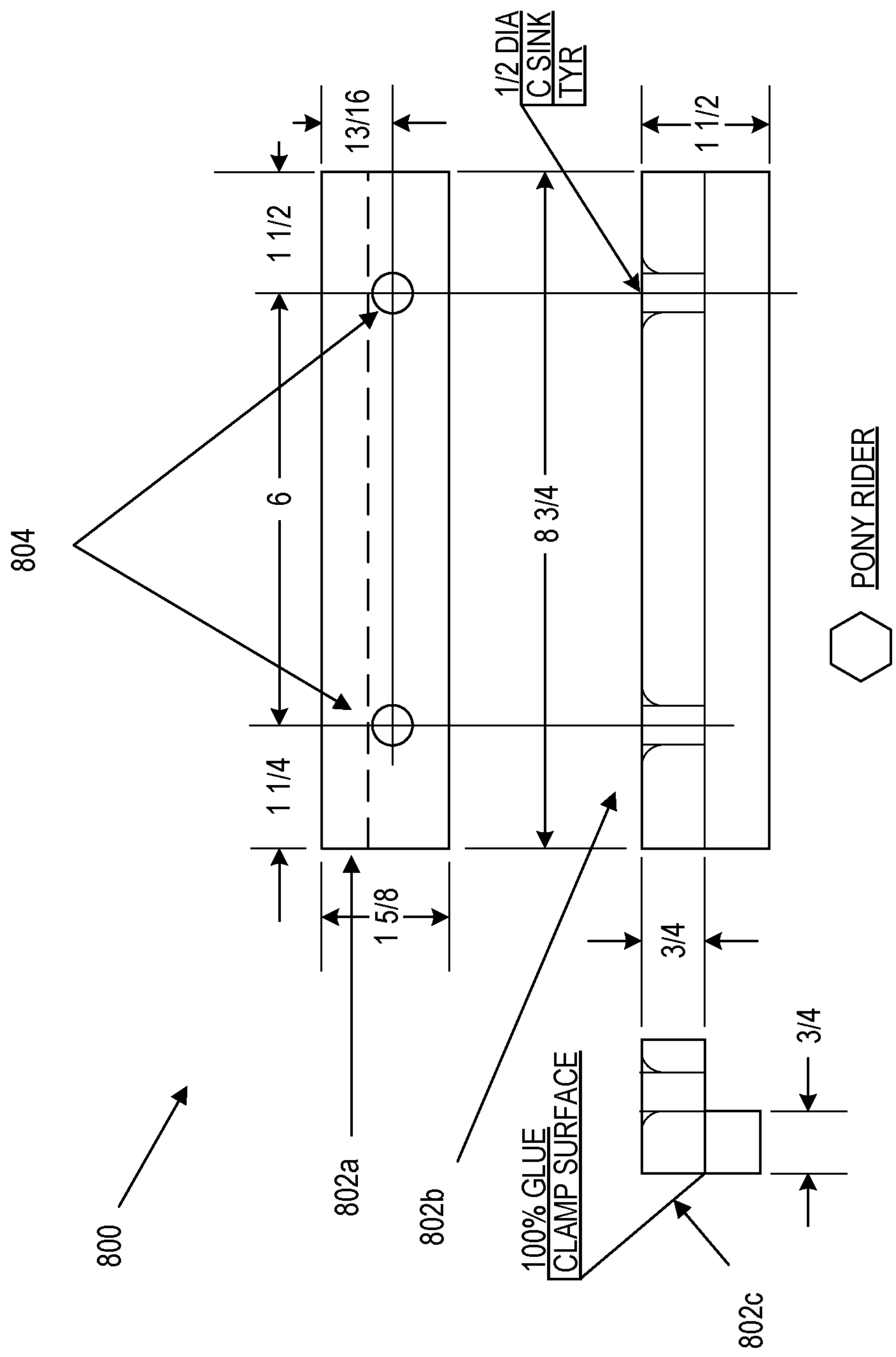
FIG. 8 illustrates a pony rider accessory in which at least some aspects of the present invention are implemented.

FIG. 8 illustrates a pony rider 800 in which at least some aspects of the present invention are implemented. 802*a*, 802*b*, and 802*c* represent a front view, a top view, and a side view respectively of the pony rider 800. The pony rider 800 comprises an oblong section with an L-shaped cross-section. It can be attached to a left rail at the attachment points 804.

Figure 9:
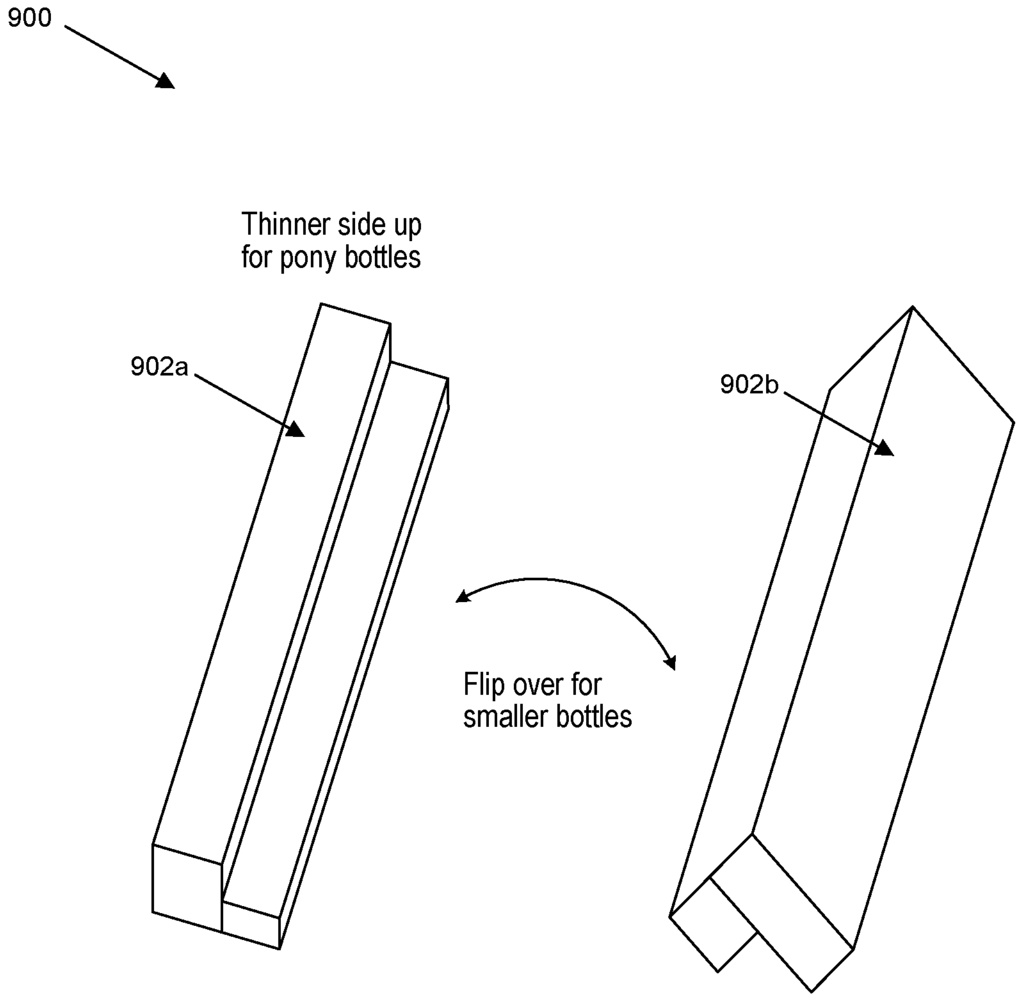
FIG. 9 illustrates two alternative configurations of a device coupled to a pony rider in which at least some aspects of the present invention are implemented.

FIG. 9 illustrates two alternative configurations of a pony rider 900 in which at least some aspects of the present invention are implemented. The pony rider 900 can be disposed in the apparatus in position 902*a* to adapt the apparatus for use with a smaller container than a standard 750 ml wine bottle, such as, for example, a standard beer bottle. The pony rider 900 can be disposed in the apparatus in position 902*b* to adapt the apparatus for use with an even smaller container than a standard 750 ml wine bottle, such as, for example a condiment bottle.

Figure 10:
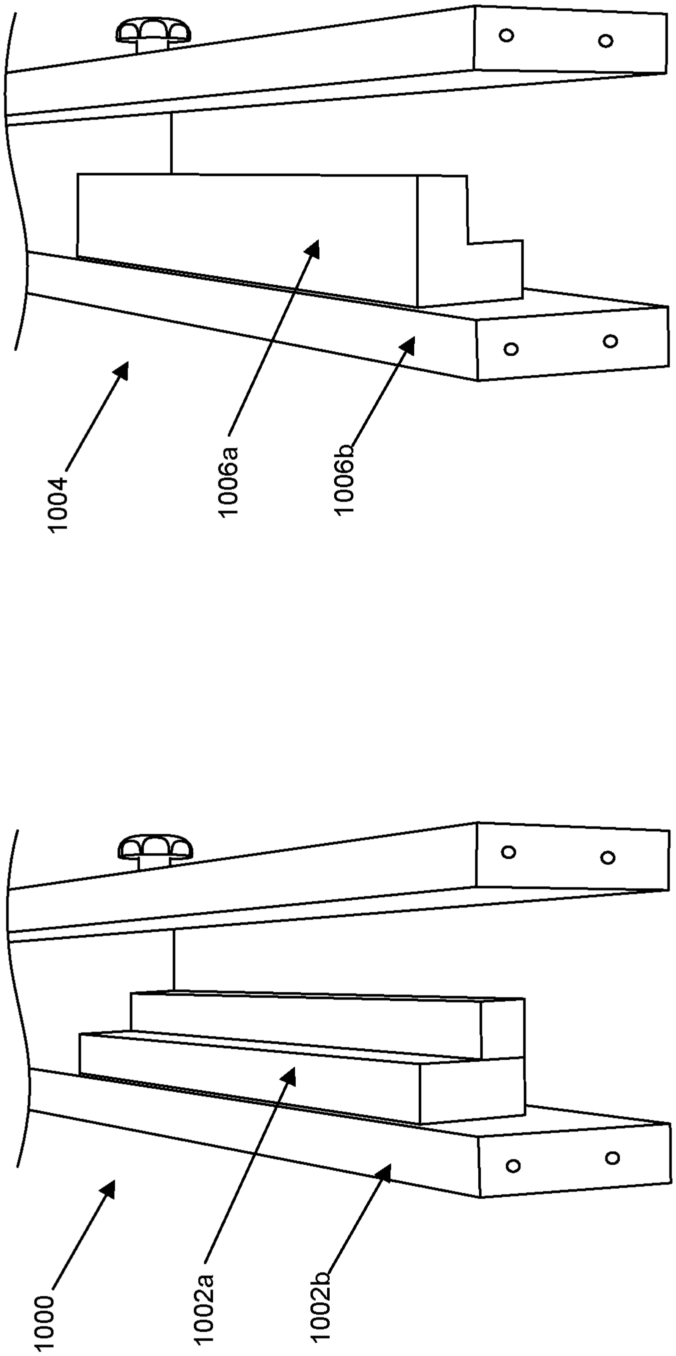
FIG. 10 illustrates two alternative configurations if a device coupled to a pony rider in which at least some aspects of the present invention are implemented to apply a label to a beer bottle and a small bottle.

FIG. 10 illustrates two alternative configurations of an apparatus coupled to a pony rider in which at least some aspects of the present invention are implemented to apply a label to a beer bottle and a small bottle. Position 1000 depicts a partial apparatus that includes a pony rider 1002*a* coupled to a left rail 1002*b*, such that the pony rider 1002*a* is positioned to form an upright L shape with a horizontal plane. In this configuration, the apparatus is adapted to apply a label to a container such as a standard beer bottle or a pony bottle. Position 1004 depicts a partial apparatus that includes a pony rider 1006*a* coupled to a left rail 1006*b*, such that the pony rider 1006*a* is positioned to form an inverted L shape with a horizontal plane. In this configuration, the apparatus is adapted to apply a label to a small container such as a condiment bottle or a sauce bottle.

Figure 11:
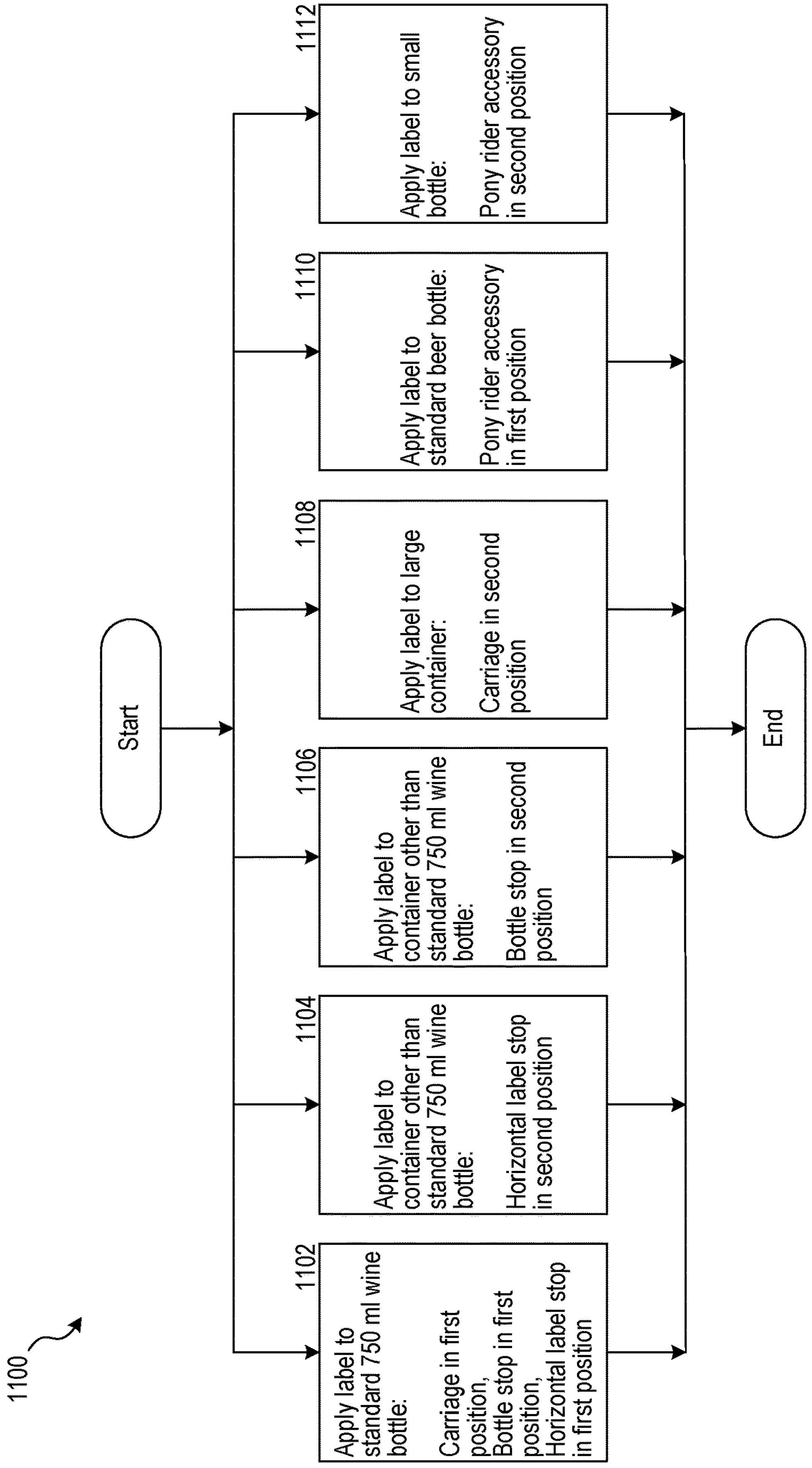
FIG. 11 illustrates a system for using the apparatus for applying a label to a container.

FIG. 11 illustrates a system 1100 for applying a label to a container. The system can be implemented using an apparatus that comprises a cradle configured to hold the container. The cradle includes a headboard forming a top wall of the cradle, a footboard forming a bottom wall of the cradle, an adjustable left rail forming a left wall of the cradle, and an adjustable right rail forming a right wall of the cradle. The adjustable left rail and the adjustable right rail are positioned parallel to each other and together form an adjustable carriage for the first container to rest upon. In a first configuration of the adjustable carriage, a plane containing the left wall of the cradle and a plane containing the right wall of the cradle are each perpendicular to a horizontal plane. In a second configuration of the adjustable carriage, a plane containing the left wall of the cradle and a plane containing the right wall of the cradle are each inclined with reference to a horizontal plane. The apparatus can be configured to hold the container with additional assistance of gravity by positioning the adjustable carriage at an incline with reference to a horizontal plane. Positioning the adjustable carriage at an incline with reference to a horizontal plane includes coupling the right rail and the left rail each with the headboard at a height greater than a height at which the right rail and the left rail each couple to the footboard. The incline of the adjustable carriage with reference to a horizontal plane can be between 5 degrees and 89 degrees, both inclusive, and is preferably 10 degrees.

The apparatus further includes an adjustable horizontal label stop disposed between the footboard and the headboard and includes a curved flange curving across the adjustable carriage. The adjustable horizontal label stop is adjustable by first loosening a horizontal label stop adjustment knob mounted in a longitudinal routed slot on the adjustable horizontal label stop, raising the adjustable horizontal label stop away from or lowering it towards the first container, and tightening the horizontal label stop adjustment knob when the adjustable horizontal label stop is in a new position. In some implementations, the horizontal label stop can be composed of a flexible material that is either a metal or plastic. In some implementations, the adjustable horizontal label stop can be coupled to the right rail with either a hinge mechanism or a spring-loaded mechanism. In some implementations, the horizontal label stop can be coupled to the left rail with either a hinge mechanism or a spring-loaded mechanism.

The apparatus further includes an adjustable bottle stop disposed in a longitudinal slot disposed in an inner side of a rail of the cradle and configured to slide forwards and backwards within the longitudinal slot. The rail of the cradle into which the longitudinal slot is disposed is the right rail or the left rail. A position of the adjustable bottle stop is adjustable by first loosening a bottle stop adjustment knob mounted in the longitudinal slot on an outer side of the rail, sliding the adjustable bottle stop forwards or backwards within the longitudinal slot, and tightening the bottle stop adjustment knob when the adjustable bottle stop is in a new position. In some implementations, the adjustable bottle stop can be disposed in a longitudinal slot in an inner side of the right rail of the cradle, and the horizontal label stop can be coupled to the left rail of the cradle. In some implementations, the adjustable bottle stop can be disposed in a longitudinal slot in an inner side of the left rail of the cradle, and the horizontal label stop can be coupled to the right rail of the cradle. The adhesive-backed label is applied to the container by placing it on a top surface of the container and aligning the adhesive-backed label with a base of the first container by touching the adhesive-backed label at two contact points formed between the adhesive-backed label and a top edge of the curved flange.

At 1102, the apparatus is configured to apply an adhesive-backed label to a container that is a standard 750 ml wine bottle by configuring the adjustable carriage to be in the first position of the adjustable carriage, adjusting the adjustable horizontal label stop into a first position of the adjustable horizontal label stop, and adjusting the adjustable bottle stop into a first position of the adjustable bottle stop.

At 1104, the apparatus is configured to apply an adhesive-backed label to a container other than a standard 750 ml wine bottle by adjusting the adjustable horizontal label stop into a second position of the adjustable horizontal label stop.

At 1106, the apparatus is configured to apply an adhesive-backed label to a container other than a standard 750 ml wine bottle by adjusting the adjustable bottle stop into a second position of the adjustable bottle stop.

At 1108, the apparatus is configured to apply an adhesive-backed label to a container that is larger than a standard 750 ml wine bottle by configuring the adjustable carriage to be in the second position of the adjustable carriage.

At 1110, the apparatus is further configured to apply a label to a container that is smaller than a standard 750 ml wine bottle by incorporating a pony rider accessory. The pony rider accessory comprises a reversible reducer rail bearing an L-shaped transverse cross-section, coupled longitudinally to an inner side of a rail of the cradle that is opposite to a rail of the cradle to which the adjustable bottle stop is coupled. In a first position, the reversible reducer rail can be coupled to the rail of the cradle such that the L-shaped cross-section forms an upright L with a horizontal plane. In a second position, the reversible reducer rail can be coupled to the rail of the cradle such that the L-shaped cross-section forms an inverted L with a horizontal plane. The apparatus incorporating the pony rider accessory is configured to apply a label to a standard beer bottle by coupling the pony rider accessory to a rail of the cradle in the first position of the pony rider accessory.

At 1112, the apparatus incorporating the pony rider accessory is configured to apply a label to a container that is narrower than a standard 750 ml wine bottle by coupling the pony rider to a rail of the cradle in the second position of the pony rider accessory.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples. All dimensions and measurements shown in the accompanying figures refer to a single embodiment and are not limiting. Other embodiments of the disclosed technology with different dimensions and measurements are possible.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," "attached," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. An apparatus for applying an adhesive-backed label to a first container, the apparatus comprising:

- a cradle configured to hold the first container, the cradle including:
  - a headboard forming a top wall of the cradle,
  - a footboard forming a bottom wall of the cradle,
  - an adjustable left rail forming a left wall of the cradle, and
  - an adjustable right rail forming a right wall of the cradle,
    - wherein the adjustable left rail and the adjustable right rail are positioned parallel to each other and together form an adjustable carriage for the first container to rest upon, and wherein, in a first configuration of the adjustable carriage, a plane containing the left wall of the cradle and a plane containing the right wall of the cradle are each perpendicular to a horizontal plane, and wherein, in a second configuration of the adjustable carriage, a plane containing the left wall of the cradle and a plane containing the right wall of the cradle are each inclined with reference to a horizontal plane;

an adjustable horizontal label stop disposed between the footboard and the headboard and including a curved flange curving across the adjustable carriage;

a horizontal label stop adjustment knob mounted in a longitudinal routed slot on the adjustable horizontal label stop;

an adjustable bottle stop disposed in a longitudinal slot disposed in an inner side of a rail of the cradle and configured to slide forwards and backwards within the longitudinal slot, wherein the rail of the cradle into which the longitudinal slot is disposed is the right rail or the left rail; and a bottle stop adjustment knob mounted in the longitudinal slot on an outer side of the rail.

2. The apparatus of claim 1 configured to apply an adhesive-backed label to a second container, wherein the adjustable carriage is configured to be adjustable in a first position of the adjustable carriage, wherein the adjustable horizontal label stop is configured to be adjustable in a first position of the adjustable horizontal label stop, and wherein the adjustable bottle stop is configured to be adjustable in a first position of the adjustable bottle stop.

3. The apparatus of claim 1 configured to apply an adhesive-backed label to a third container other than a standard 750 ml wine bottle, wherein the adjustable horizontal label stop is configured to be adjustable in a second position of the adjustable horizontal label stop.

4. The apparatus of claim 1 configured to apply an adhesive-backed label to a fourth container other than a standard 750 ml wine bottle, wherein the adjustable bottle stop is configured to be adjustable in a second position of the adjustable bottle stop.

5. The apparatus of claim 1 configured to apply an adhesive-backed label to a fifth container, wherein the adjustable carriage is configured to be adjustable in the second position of the adjustable carriage.

6. The apparatus of claim 1 configured to hold the first container by positioning the adjustable carriage at an incline with reference to a horizontal plane, wherein positioning the adjustable carriage at an incline with reference to a horizontal plane includes coupling the right rail and the left rail each with the headboard at a height greater than a height at which the right rail and the left rail each couple to the footboard, wherein the incline of the adjustable carriage with reference to a horizontal plane is between 5 degrees and 89 degrees.

7. The apparatus of claim 1 configured with:

the adjustable bottle stop disposed in a longitudinal slot in an inner side of the right rail of the cradle, and the horizontal label stop coupled to the left rail of the cradle.

8. The apparatus of claim 1 configured with:

the adjustable bottle stop disposed in a longitudinal slot in an inner side of the left rail of the cradle, and the horizontal label stop coupled to the right rail of the cradle.

9. The apparatus of claim 1 further comprising the horizontal label stop composed of a flexible material that is either a metal or a plastic.

10. The apparatus of claim 1 further comprising the horizontal label stop coupled to the right rail with either a hinge mechanism or a spring-loaded mechanism.

11. The apparatus of claim 1 further comprising the horizontal label stop coupled to the left rail with either a hinge mechanism or a spring-loaded mechanism.

12. The apparatus of claim 1 further configured to apply a label to a sixth container by incorporating a pony rider accessory, the pony rider accessory comprising:

a reversible reducer rail bearing an L-shaped transverse cross-section, coupled longitudinally to an inner side of a rail of the cradle, wherein the rail of the cradle to which the reversible reducer rail is coupled is the adjustable right rail when the bottle stop adjustment knob is mounted in the longitudinal slot on an outer side of the adjustable left rail, or wherein the rail of the cradle to which the reversible reducer rail is coupled is the adjustable left rail when the bottle stop adjustment knob is mounted in the longitudinal slot on an outer side of the adjustable right rail, wherein, in a first position, the reversible reducer rail is coupled to the rail of the cradle such that the L-shaped cross-section forms an upright L with a horizontal plane, and wherein, in a second position, the reversible reducer rail is coupled to the rail of the cradle such that the L-shaped cross-section forms an inverted L with a horizontal plane.

13. The apparatus of claim 12 configured to apply a label to a seventh container, wherein the pony rider accessory is coupled to the rail of the cradle in the first position of the pony rider accessory.

14. The apparatus of claim 12 configured to apply a label to an eighth container, wherein the pony rider accessory is coupled to a rail of the cradle in the second position of the pony rider accessory.

15. A system for applying a first adhesive-backed label to a first container, the system comprising:

a cradle configured to hold the first container, the cradle including:

a headboard forming a top wall of the cradle;

a footboard forming a bottom wall of the cradle;

an adjustable left rail forming a left wall of the cradle; and an adjustable right rail forming a right wall of the cradle, wherein the adjustable left rail and the adjustable right rail are positioned parallel to each other and together form an adjustable carriage for the first container to rest upon, wherein, in a first configuration of the adjustable carriage, a plane containing the left wall of the cradle and a plane containing the right wall of the cradle are each perpendicular to a horizontal plane, and wherein, in a second configuration of the adjustable carriage, a plane containing the left wall of the cradle and a plane containing the right wall of the cradle are each inclined with reference to a horizontal plane;

an adjustable horizontal label stop disposed between the footboard and the headboard and including a curved flange curving across the adjustable carriage;

a horizontal label stop adjustment knob mounted in a longitudinal routed slot on the adjustable horizontal label stop;

an adjustable bottle stop disposed in a longitudinal slot disposed in an inner side of a rail of the cradle and configured to slide forwards and backwards within the longitudinal slot, wherein the rail of the cradle into which the longitudinal slot is disposed is the right rail or the left rail; and a bottle stop adjustment knob mounted in the longitudinal slot on an outer side of the rail.

16. The system of claim 15 caused to apply a second adhesive-backed label to a second container, wherein the adjustable carriage is configured to be adjustable in the first configuration of the adjustable carriage, wherein the adjustable horizontal label stop is configured to be adjustable in a first position of the adjustable horizontal label stop, and wherein the adjustable bottle stop is configured to be adjustable in a first position of the adjustable bottle stop.

17. The system of claim 15 further comprising a pony rider accessory, the pony rider accessory including:

a reversible reducer rail bearing an L-shaped transverse cross-section, coupled longitudinally to an inner side of a rail of the cradle, wherein the rail of the cradle to which the reversible reducer rail is coupled is the adjustable right rail when the bottle stop adjustment knob is mounted in the longitudinal slot on an outer side of the adjustable left rail, or wherein the rail of the cradle to which the reversible reducer rail is coupled is the adjustable left rail when the bottle stop adjustment knob is mounted in the longitudinal slot on an outer side of the adjustable right rail, wherein, in a first position, the reversible reducer rail is coupled to the rail of the cradle such that the L-shaped cross-section forms an upright L with a horizontal plane, and wherein, in a second position, the reversible reducer rail is coupled to the rail of the cradle such that the L-shaped cross-section forms an inverted L with a horizontal plane;

the system caused to:

apply a third adhesive-backed label to a third container that is a standard beer bottle by coupling the pony rider accessory to a rail of the cradle in the first position of the pony rider accessory.

18. The apparatus of claim 6 wherein the incline of the adjustable carriage with reference to a horizontal plane is substantially 10 degrees.

* * * * *